(12) United States Patent
Robinson et al.

(10) Patent No.: US 8,829,346 B2
(45) Date of Patent: Sep. 9, 2014

(54) BUS BAR RETENTION SNAPS FOR A BASE PAN ASSEMBLY

(75) Inventors: Kristopher Scott Robinson, Atlanta, GA (US); Jeffrey Kenton Hudgins, Jr., Gainesville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 256 days.

(21) Appl. No.: 13/404,642

(22) Filed: Feb. 24, 2012

(65) Prior Publication Data
US 2013/0220669 A1 Aug. 29, 2013

(51) Int. Cl.
*H02G 5/06* (2006.01)
*H02B 1/20* (2006.01)
*H02B 1/21* (2006.01)
*H02G 5/00* (2006.01)

(52) U.S. Cl.
CPC .. *H02G 5/00* (2013.01); *H02B 1/20* (2013.01); *H02B 1/21* (2013.01)
USPC ... 174/72 B; 174/99 B; 174/68.2; 174/129 B; 361/611; 361/637

(58) Field of Classification Search
CPC ........... H02G 5/025; H02G 5/00; H02G 5/02; H02B 1/21; H02B 1/20; H02B 1/00; H05K 2201/10272; H05K 2203/167; H05K 5/00; H01R 13/53; H01R 25/16

USPC ......... 174/135, 72 B, 71 B, 88 B, 70 B, 99 B, 174/129 B, 133 B, 149 B, 68.2; 361/600, 361/601, 624, 627, 637, 639, 648, 675, 611, 361/699.2, 34; 439/212, 213, 210, 76.1, 439/76.2, 949, 55, 66, 114; 29/453, 592, 29/428, 446
See application file for complete search history.

(56) References Cited

U.S. PATENT DOCUMENTS

| | | | |
|---|---|---|---|
| 5,329,424 A * | 7/1994 | Patel | 174/72 B |
| 5,854,445 A * | 12/1998 | Graham et al. | 174/99 B |
| 6,459,570 B1 * | 10/2002 | Buchanan | 361/648 |
| 7,499,262 B1 * | 3/2009 | Darr | 439/76.2 |
| 7,655,865 B2 * | 2/2010 | Wagener | 174/99 B |
| 7,799,991 B1 * | 9/2010 | Advey | 174/50 |
| 8,014,131 B2 * | 9/2011 | Hudgins et al. | 361/637 |

* cited by examiner

*Primary Examiner* — Angel R Estrada

(57) ABSTRACT

A retention snap arrangement for attaching a bus bar to a base pan. The arrangement includes first and second walls for forming a channel for receiving the bus bar. The arrangement further includes a first moveable arm having a first snap element that includes a first bottom surface and a second moveable arm having a second snap element that includes a second bottom surface. The first and second arms extend from the first and second walls, respectively, each forming a cantilever. In a first position, the first and second bottom surfaces are located above an edge of the bus bar for inhibiting movement of the bus bar. In a second position, the first and second bottom surfaces are not located above the edge of the bus bar to enable insertion of the bus bar in the channel.

15 Claims, 6 Drawing Sheets

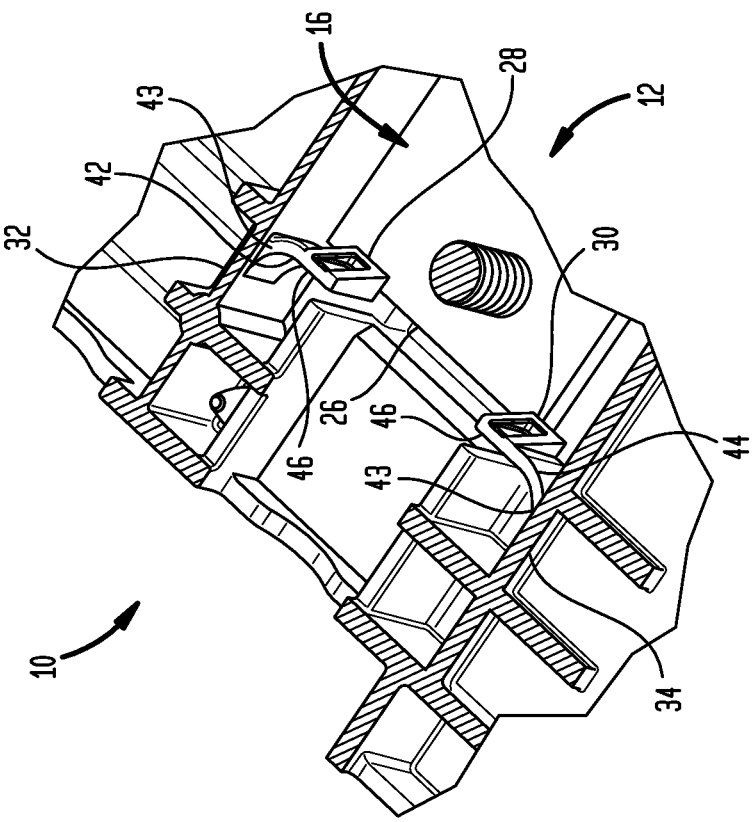
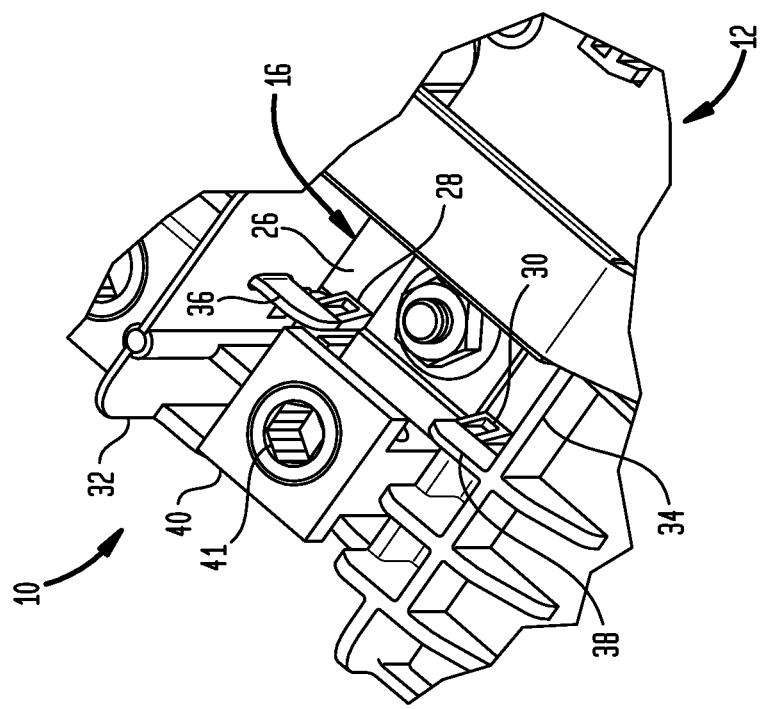

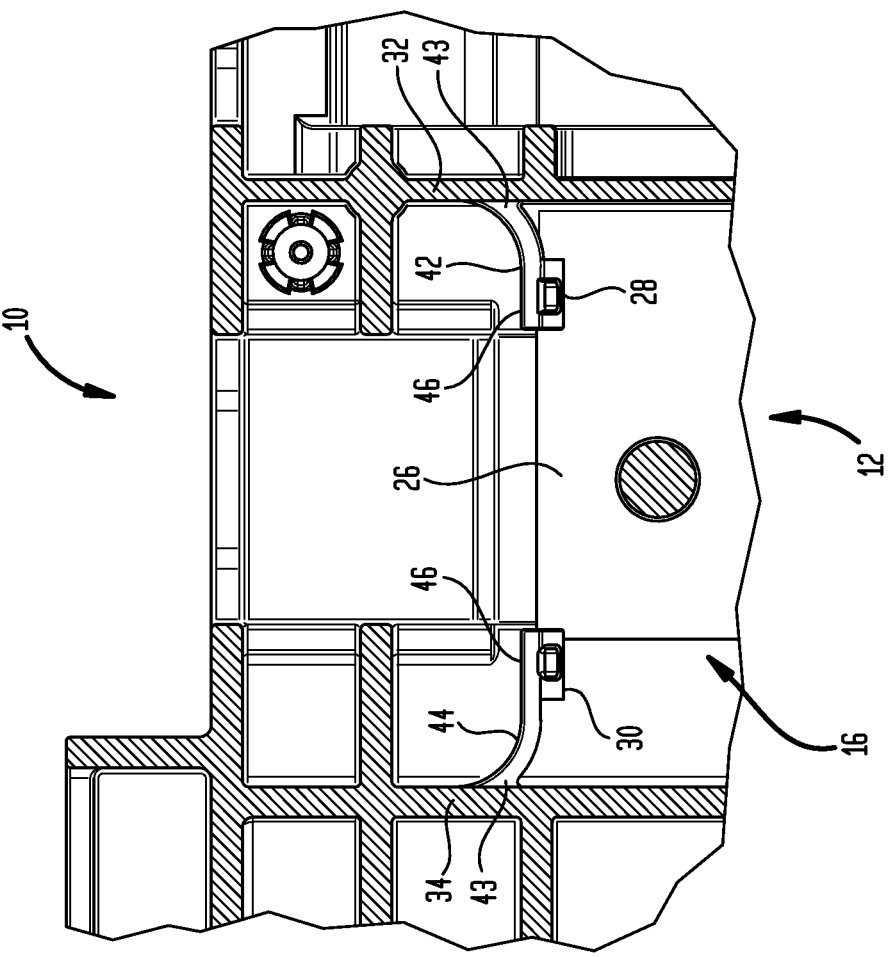

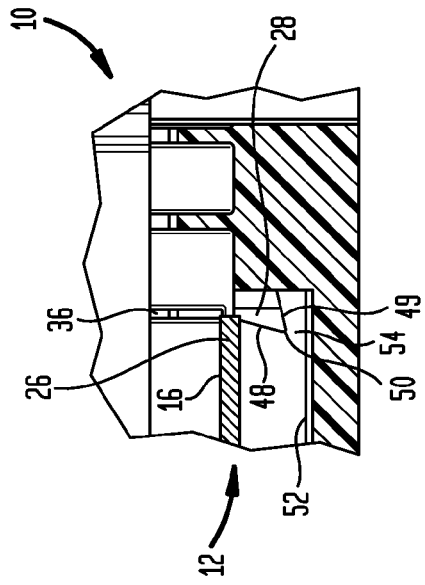
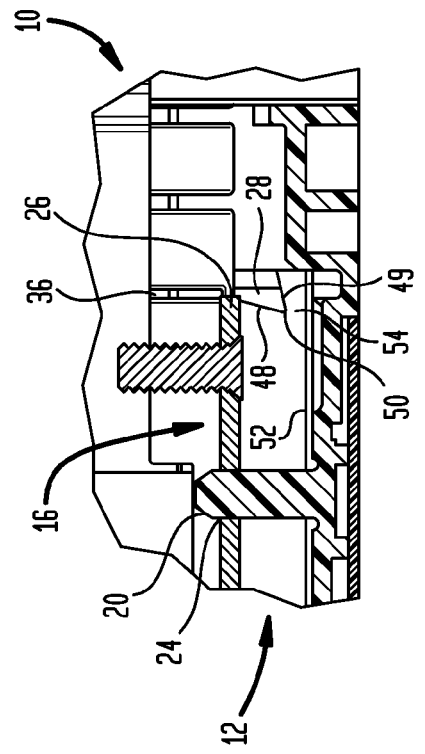
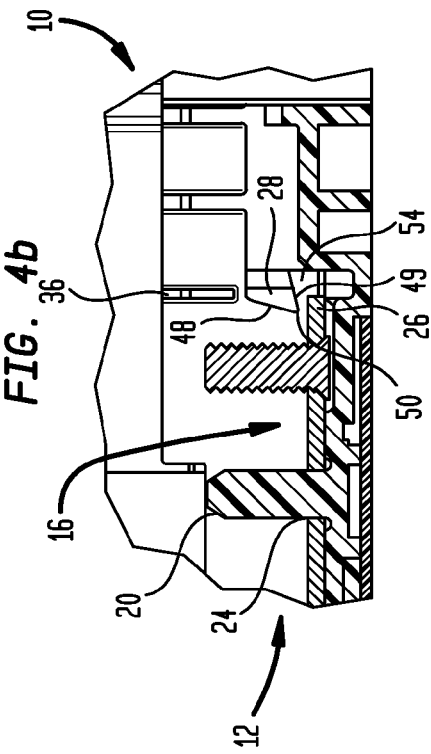

BUS BAR RETENTION SNAPS FOR A BASE PAN ASSEMBLY

FIELD OF THE INVENTION

This invention relates to a base pan assembly, and more particularly, to bus bar retention snaps which are located on moveable arms to enable installation and retention of a bus bar on the base pan.

BACKGROUND OF THE INVENTION

A load center provides overcurrent protection for an electrical system of a building and distributes power to various branch circuits of the electrical system. In particular, a load center may be configured either as a main breaker device including items such as a main circuit breaker, branch circuit breakers and other components or as a main lug device.

Various components of a load center such as bus bars, neutral bars and others are mounted to a base pan located in an enclosure. The bus bars serve as a common connection for two or more circuits and may be used to connect circuit breakers to service conductors and load wiring. In conventional base pan configurations, main portions of a bus bar are secured to the base pan. However, the base pan includes wire connectors in top, bottom and side edges of the bus bar located at a substantial distance from where the main portions of the bus bar are attached to the base pan. Thus, when a wire is inserted into a wire connector and the wire connector fastener is tightened against the wire, a top end, for example, of the bus bar is undesirably pulled up and out of a desired mounting position for the bus bar.

SUMMARY OF THE INVENTION

A retention snap arrangement for attaching a bus bar to a base pan is disclosed. The arrangement includes first and second walls for forming a channel for receiving the bus bar. The arrangement further includes a first moveable arm having a first snap element that includes a first bottom surface and a second moveable arm having a second snap element that includes a second bottom surface. The first and second arms extend from the first and second walls, respectively, each forming a cantilever. In a first position, the first and second bottom surfaces are located above an edge of the bus bar for inhibiting movement of the bus bar. In a second position, the first and second bottom surfaces are not located above the edge of the bus bar to enable insertion of the bus bar in the channel.

BRIEF DESCRIPTION OF THE DRAWINGS

FIG. 3a is a perspective view of a top edge of a first bus bar when positioned in a first channel.

FIG. 3b is a view similar to that of FIG. 3a wherein first and second vertical stops are removed.

FIG. 3c is a top view of FIG. 3b.

FIGS. 4a-4b show cross sectional views of the first channel.

FIG. 5 depicts a top edge of the first bus bar contacting the first vertical stop.

DESCRIPTION OF THE INVENTION

Figure 1:
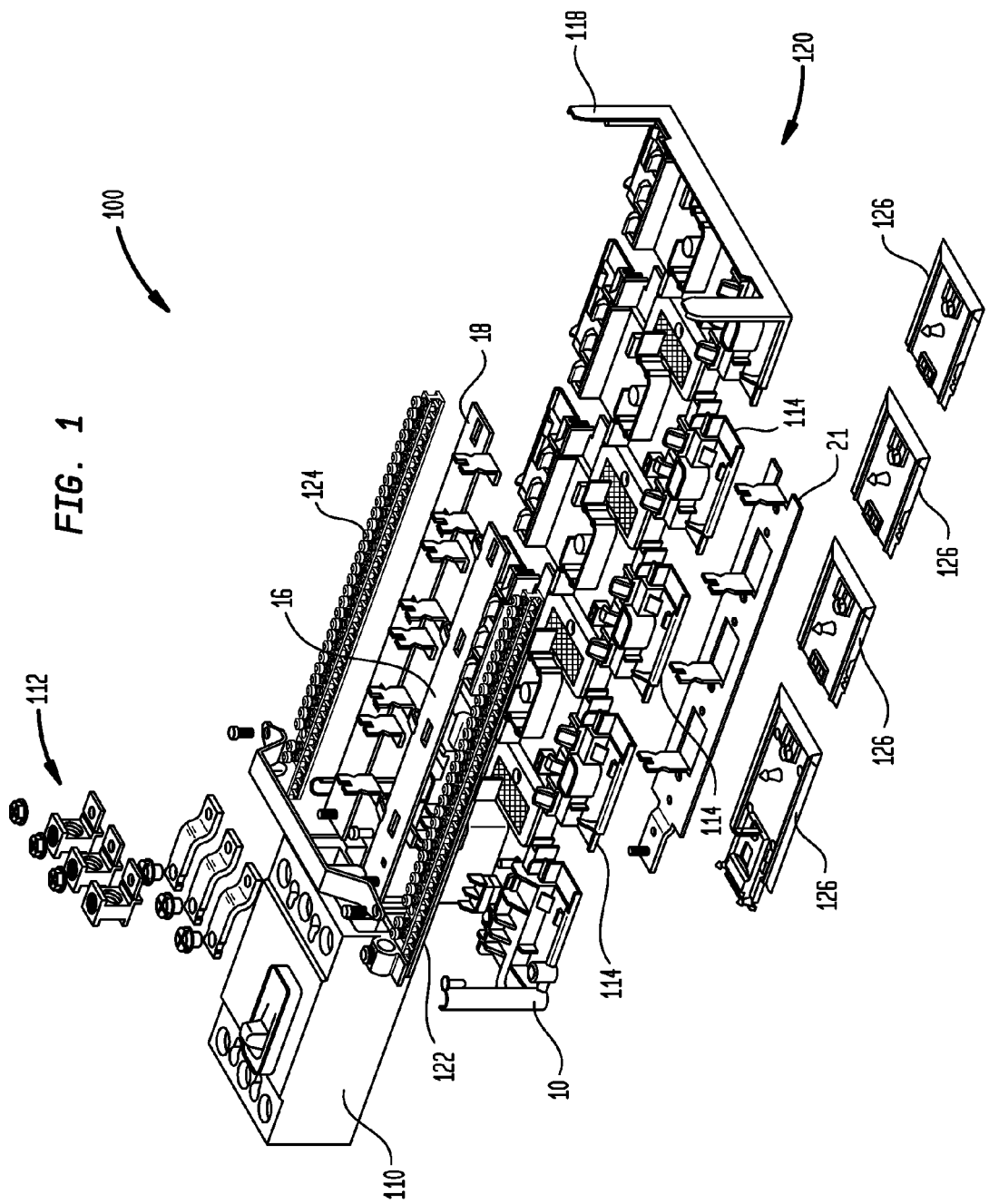
FIG. 1 depicts a three phase load center interior assembly including a base pan.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-6b.

A load center may include an interior assembly having bus bars, neutral bars and other associated items that are mounted to a base pan located in an enclosure. The bus bars serve as a common connection for two or more circuits and may be used to connect circuit breakers to service conductors and load wiring. Referring to FIG. 1, a three phase load center interior assembly 100 suitable for configuring as either a main breaker device including a main circuit breaker 110 or a main lug device including main lugs 112 is shown in an exploded view. The interior assembly 100 includes a base pan assembly 120 having a plurality of mid-portions 114 located between a top portion 10 and a bottom portion 118. In one embodiment, the top 10, mid-module 114 and bottom 118 modules are each fabricated from a resilient material having insulative properties such as plastic by using an extrusion or injection molding process. The base pan assembly 120 includes first 16, second 18 and third 21 bus bars and first 122 and second 124 neutral bars. Further, the base pan assembly 120 includes a plurality of insulators 126 for insulating the third bus bar 21.

Figure 2:
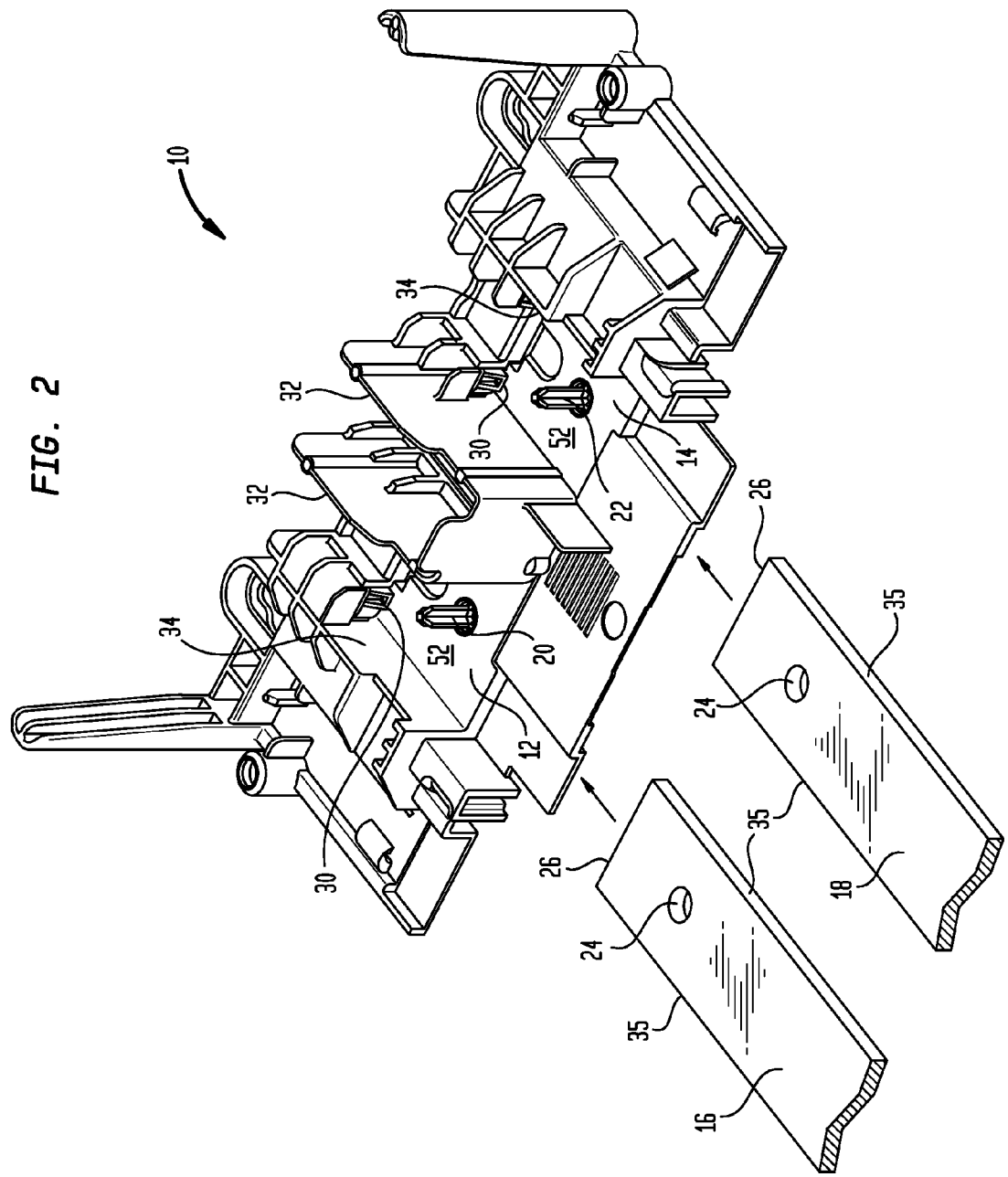
FIG. 2 depicts an exemplary top portion of the base pan assembly.

Referring to FIG. 2, an exemplary top portion 10 of the base pan assembly 120 is shown. The top portion 10 includes spaced apart first 32 and second 34 channel walls which form first 12 and second 14 channel areas for accommodating the first 16 and second 18 bus bars, respectively. The first and second 14 channel areas are of sufficient width to accommodate first 16 and second 18 bus bars having a range of widths. The first 32 and second 34 channel walls extend along longitudinal side edges 35 of the first 16 and second 18 bus bars. By way of example, the first 16 and second 18 bus bars may be first and second phase bus bars used in a three phase load center. The first 16 and second 18 bus bars each include an aperture 24 and an end or top edge 26. The first 12 and second 14 channel areas include first 20 and second 22 guide posts which are received by a respective aperture 24.

The current invention will now be described in relation to the first channel 12, first bus bar 16 and associated elements. The following description also applies to elements associated with the second channel 14 and second bus bar 18 which includes the same or similar elements and operate in the same or similar manner. Referring to FIG. 3a, a perspective view of the top edge 26 of the first bus bar 16 when positioned in the first channel 12 is shown. The top portion 10 includes first 28 and second 30 retention snaps which are shown in a first position wherein the top edge 26 of the first bus bar 16 is captured by the first 28 and second 30 retention snaps to inhibit movement of the end 36. The first 28 and second 30 retention snaps extend from first 42 and second 44 arms attached to the first 32 and second 34 channel walls as will be described in relation to FIG. 3b. The top portion 10 also includes first 36 and second 38 vertical stops that extend from the first 32 and second 34 channel walls into the first channel 12 and are located above the first 28 and second 30 retention snaps, respectively. The first 28 and second 30 retention snaps are positioned along the top edge 26 such that a wire connector 40 is located between the first 28 and second 30 retention snaps. Thus, the first 28 and second 30 snaps are positioned to inhibit a pulling up or upward movement of the top edge 26 away from a desired mounting position due to tightening of a wire connector fastener 41 against a wire.

Referring to FIG. 3b, a view similar to that of FIG. 3a is shown wherein the first 36 and second 38 vertical stops are removed. FIG. 3c is a top view of FIG. 3b. First 42 and second 44 curved arms extend from the first 32 and second 34 channel walls, respectively, and into the first channel 12 to form a cantilever arrangement. The first 28 and second 30 retention snaps are located on ends 46 of the first 42 and second 44 arms, respectively. Application of a force on the first retention snap 28 toward the top edge 26, for example, causes the first arm 42 and first retention snap 28 to move in an arc relative to an attachment location 43 where the first arm 42 extends from the first wall 32, thus causing the first retention snap 28 to deflect toward the top edge 26. Upon removal of the force, the first retention snap 28 returns to the first position as shown in FIGS. 3a-3c. Similarly, the second retention snap 30 also returns to its original position after being deflected.

Referring to FIGS. 4a-4b, a cross sectional view of the first channel 12 is shown. In FIG. 4a, the first retention snap 28 is shown in the first position. The first retention snap 28 includes a downwardly sloping snap surface 48 that terminates in an edge portion 50 to form a bottom surface 49 located a predetermined distance above a base surface 52 of the first channel 12 to form a gap 54. In order to secure the top edge 26 to the top portion 10, the first guide post 20 is inserted into the aperture 24 of the first bus bar 16. In particular, the first guide post 20 and aperture 24 are positioned relative to each other such that upon insertion of the first guide post 20 into aperture 24, the top edge 26 is positioned above the first retention snap 28. The first bus bar 16 is then pushed down toward the base surface 52, thus causing the top edge 26 to contact the snap surface 48. This causes the first retention snap 28 to deflect to a second position to enable the top edge 26 to slide past the snap surface 48. Once the top edge 26 is located in the gap 54, the first retention snap 28 returns or springs back to the first position such that the edge portion 50 captures the top edge 26 as shown in FIG. 4b. In this position, upward movement of the top edge 26 is blocked by the edge portion 50 and the bottom surface 49 to thus inhibit upward movement of the first bus bar 16. In addition, the first bus bar 16 rests on the base surface 52. In accordance with the invention, use of the first 28 and second 30 retention snaps to capture the top edge 26 of a bus bar enables the use of bus bars having a range of widths and thus amperage capacity. Therefore, the same base pan can be used to accommodate devices having a range of amperages.

Referring to FIG. 5, the first bus bar 16 may be subjected to a sufficient force during use to cause deflection of the first retention snap 28, thus enabling the top edge 26 to slide past the first retention snap 28 and move upward. When this occurs, the first vertical stop 36 is positioned such that the top edge 26 contacts the first vertical stop 36 to stop upward movement of the top edge 26. As such, the first vertical stop 36 provides a failsafe that limits the total amount of movement possible for the top edge 26.

Figure 6A:
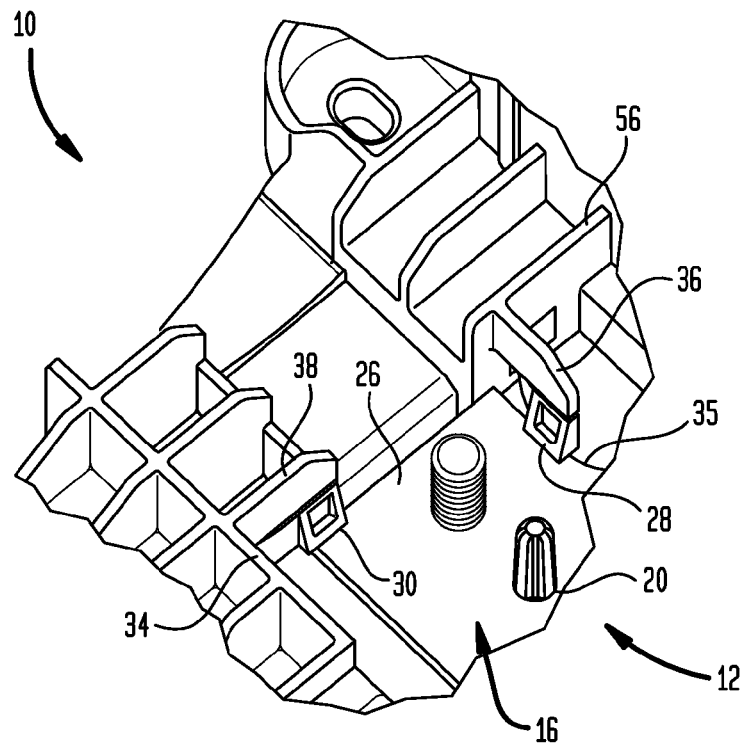
FIGS. 6a-6b depict an alternate embodiment of the current invention wherein the first retention snap captures a side edge of the first bus bar and the second retention snap captures the top edge.
Figure 6B:
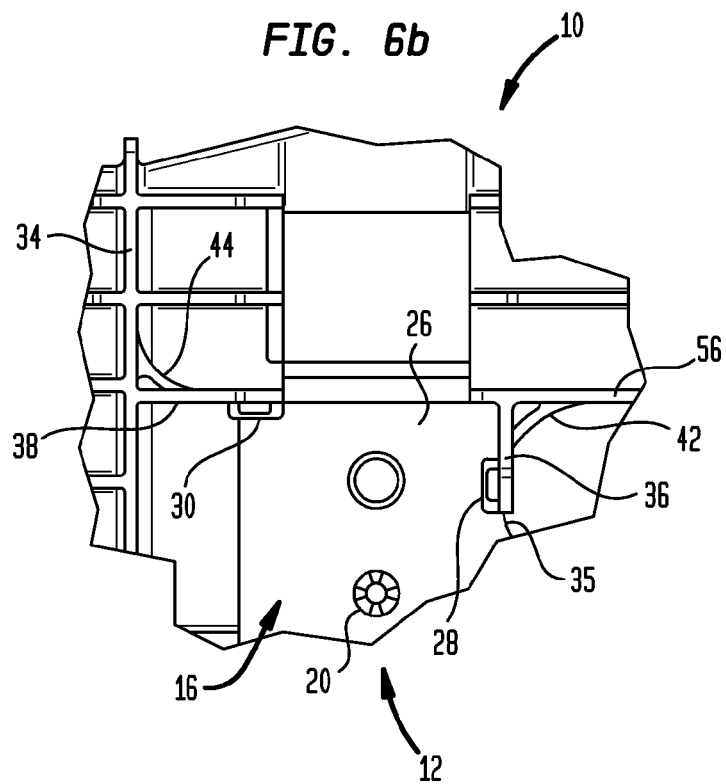

Referring to FIGS. 6a-6b, an alternate embodiment of the current invention is shown. In this embodiment, the first retention snap 28 is positioned so that it captures a side edge 35 of the first bus bar 16. In particular, the first arm 42 extends from a side wall 56 that is positioned transverse to the orientation of the second channel wall 34. Further, the first vertical stop 36 extends from the side wall 56 above the first retention snap 28. In accordance with the invention, additional or fewer retention snaps may be used along either the top edge 26 or the side edges 35 or both in order to inhibit movement of the first bus bar 16. In addition, the first 28 and second 30 retention snaps may be located in other sections of the base pan assembly 120 as desired in order to inhibit movement of other portions of the first bus bar 16 or the second bus bar 18.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A retention snap arrangement for attaching a bus bar to a base pan having a first channel wall wherein the bus bar includes a longitudinal side edge and a bus bar end oriented transverse to the longitudinal side edge and wherein the longitudinal side edge is located adjacent the first channel wall, comprising:
   a first moveable arm having a curved portion that extends from the first channel wall to form a cantilever; and
   a first snap element attached to the first arm wherein the first snap element includes a first bottom surface located above the bus bar end for inhibiting movement of the bus bar end.

2. The retention snap arrangement according to claim 1, wherein the base pan includes a guide post for insertion into an aperture formed in the bus bar for aligning the bus bar end with the first snap element.

3. The retention snap arrangement according to claim 1, wherein the first arm is fabricated from a resilient material to enable deflection of the first arm from a first position wherein the first snap element inhibits movement of the bus bar end to a second position wherein the first snap element does not block the bus bar end to enable movement of the bus bar.

4. The retention snap arrangement according to claim 3, wherein the first arm is moved to the second position due to contact between the first snap element and the bus bar end and wherein the first arm springs back to the first position after the contact ends.

5. The retention snap arrangement according to claim 4, wherein the first snap element includes a sloping surface for contacting the bus bar end.

6. The retention snap arrangement according to claim 1, further including a second moveable arm having a curved portion that extends from a second channel wall to form a cantilever wherein the second arm includes a second snap element having a second bottom surface located above the bus bar end for inhibiting movement of the bus bar end.

7. A retention snap arrangement for attaching a bus bar to a base pan, wherein the bus bar includes first and second longitudinal side edges and a bus bar end oriented transverse to the first and second longitudinal side edges, comprising:

first and second channel walls for forming a channel for receiving the bus bar wherein the first and second longitudinal side edges are located adjacent the first and second channel walls, respectively;

a first moveable arm having a first snap element that includes a first bottom surface; and a second moveable arm having a second snap element that includes a second bottom surface, wherein the first and second arms each include a curved portion that extends from the first and second channel walls, respectively, each forming a cantilever and wherein in a first position the first and second bottom surfaces are located above the bus bar end for inhibiting movement of the bus bar end and wherein in a second position the first and second bottom surfaces are not located above the bus bar end to enable insertion of the bus bar in the channel.

8. The retention snap arrangement according to claim 7, wherein the base pan includes a guide post for insertion into an aperture formed in the bus bar for aligning the bus bar end with the first and second snap elements.

9. The retention snap arrangement according to claim 7, wherein the first and second arms are fabricated from a resilient material to enable deflection of the first and second arms from a first position wherein the first and second snap elements inhibit movement of the bus bar end to a second position wherein the first and second snap elements do not block the bus bar end to enable movement of the bus bar.

10. The retention snap arrangement according to claim 9, wherein the first and second arms are moved to the second position due to contact between the first and second snap elements and the bus bar end and wherein the first and second arms spring back to the first position after the contact ends.

11. The retention snap arrangement according to claim 10, wherein the first and second snap elements include a sloping surface for contacting the bus bar end.

12. A method for installing a bus bar in a channel of a base pan, wherein the bus bar includes a longitudinal side edge and a bus bar end oriented transverse to the longitudinal side edge, comprising the steps of:

providing first and second movable arms each including a curved portion;

providing a first snap element on the first arm;

providing a second snap element on the second arm, wherein the first and second snap elements include first and second bottom surfaces, respectively;

contacting the first and second snap elements with the bus bar end to deflect the first and second snap elements to enable insertion of the bus bar into the channel the wherein first and second bottom surfaces inhibit movement of the bus bar end.

13. The method according to claim 12, wherein the base pan includes a guide post for insertion into an aperture formed in the bus bar for aligning the bus bar end with the first and second snap elements.

14. The method according to claim 12, wherein the first and second arms are fabricated from a resilient material.

15. The method according to claim 12, wherein the first and second snap elements include a sloping surface for contacting the bus bar end.

* * * * *